UNITED STATES PATENT OFFICE.

HORATIO P. CONNELL, OF PHILADELPHIA, PENNSYLVANIA.

KUMISS AND METHOD OF MAKING SAME.

SPECIFICATION forming part of Letters Patent No. 607,634, dated July 19, 1898.

Application filed December 13, 1897. Serial No. 661,723. (No specimens.)

*To all whom it may concern:*

Be it known that I, HORATIO P. CONNELL, a citizen of the United States, residing at Philadelphia, in the county of Philadelphia and State of Pennsylvania, have invented certain new and useful Improvements in Processes of Manufacturing Kumiss; and I do hereby declare the following to be a full, clear, and exact description of the invention, such as will enable others skilled in the art to which it appertains to make and use the same.

This invention relates to a sterilized kumiss beverage.

Much difficulty has heretofore been experienced in handling and administering kumiss as ordinarily prepared. It did not possess the requisite keeping qualities, and was liable in use to become excessively acid after a few days' keeping, and, besides, caused much trouble and loss by reason of too active fermentation and breaking of the bottles in which it was put up for the trade. The object of my invention is to overcome these difficulties and provide a bottled kumiss beverage possessing all the characteristics of good effervescent kumiss, which will keep in that condition for an indefinite length of time, and is in practically a sterilized condition.

By my improved process of preparing the kumiss I impart to it the safeguard of sterilization.

My kumiss possesses valuable therapeutic properties and is a nutritious dietetic. It is also a delicate and agreeable beverage, suitable for the lunch or dining table.

I will now describe the details of my process for preparing sterilized kumiss as follows:

In eighty-four (84) grains of water which has been filtered and boiled and at a temperature of 85° I thoroughly dissolve thirteen (13) grains of Fleishmann's Vienna compressed yeast or other suitable yeast. This solution of yeast is set aside for subsequent use. To twenty-two (22) ounces avoirdupois of pure whole milk I add two hundred and ninety-three (293) grains of dry granulated sugar and dissolve it thoroughly therein. This solution of sugar in milk is then placed in a one-quart champagne-bottle or other quart bottle of equal strength, and the neck is plugged with absorbent cotton. The bottle containing this simple solution of sugar in milk is then pasteurized by being placed in a boiler having a false bottom or grating raised about one-half inch from the bottom of the boiler. The boiler may be made of any suitable material—such as tin, copper, or iron—and of a capacity to hold from one (1) to one thousand (1,000) or more bottles, according to the scale on which the kumiss is manufactured. The water is admitted to the boiler at a temperature of not less than 50° nor more than 85° Fahrenheit till it rises to a height of about one inch above the milk contained in the bottle or bottles. Alongside of the above-mentioned bottle I place in the boiler a test-bottle filled and plugged exactly like the described bottle and in which from time to time I insert a test-thermometer. The boiler is covered with a tightly-fitting lid and is placed over a fire and the contained water heated to the boiling-point of 212° Fahrenheit, (ascertained by the thermometer,) and then the heat is continued during a period of from twenty-five to thirty minutes till the milk in the bottles is heated to the boiling-point of 212° Fahrenheit, which is ascertained by dipping the thermometer in the test-bottle. The bottle of milk is now immediately removed from the boiler and placed upon a table covered with a thick cloth in a temperature of at least 70° Fahrenheit, and the contained milk allowed to cool down to a temperature of 85° Fahrenheit, ascertained by dipping the thermometer into the described test-bottle. The absorbent-cotton plug is now removed from the bottle of milk, and at the same instant the above-described mixture or solution of yeast is dropped in the bottle, a permanent cork is inserted and wired down, and the bottle well shaken. The bottle is then placed on a rack, cork downward, and allowed to remain there in a temperature of from 60° to 70° Fahrenheit for twelve (12) hours. It is then placed on a rack, cork downward, in a temperature of from 45° to 55° Fahrenheit and allowed to remain there for seven days, by which time the contained kumiss is ripe and will keep an indefinite length of time, fresh, effervescent, and practically sterile kumiss.

Having described my invention, what I claim, and desire to secure by Letters Patent, is—

1. The process of manufacturing a pasteurized and practically sterile kumiss which consists in placing a mixture of milk and sugar, in suitable proportions, in a bottle, closing with a porous seal to exclude germs, pasteurizing it by heat, then cooling to the proper temperature, approximating 85° Fahrenheit, then removing said seal and adding a suitable proportion of yeast, corking, shaking, cooling and keeping at a low temperature till ripened.

2. The process of manufacturing a pasteurized and practically sterile kumiss which consists in placing a mixture of milk and sugar in solution in a bottle, plugging the same with absorbent cotton, subjecting the bottle to heat till the contents are heated to 212° Fahrenheit, then cooling to approximately 85° Fahrenheit, then removing the cotton plug and adding a suitable proportion of yeast, then corking, wiring and shaking well, and storing in a temperature of between 45° and 55° Fahrenheit, till ripened.

3. A bottled effervescent, ripened and practically sterile kumiss, obtained from sweetened pasteurized milk and yeast, free from antiseptic additions, and possessing the property of keeping for an almost indefinite period, substantially as set forth.

In testimony whereof I affix my signature in presence of two witnesses.

HORATIO P. CONNELL.

Witnesses:
　WM. BLINKHORN,
　GEORGE BLINKHORN.